(12) United States Patent
Sutton

(10) Patent No.: US 9,401,985 B2
(45) Date of Patent: *Jul. 26, 2016

(54) VEHICLE EVENT RECORDER MOBILE PHONE MOUNT

(71) Applicant: Lytx, Inc., San Diego, CA (US)

(72) Inventor: Greg Sutton, Del Mar, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,294

(22) Filed: Nov. 24, 2015

(65) Prior Publication Data

US 2016/0080557 A1    Mar. 17, 2016

Related U.S. Application Data

(63) Continuation of application No. 14/035,739, filed on Sep. 24, 2013, now Pat. No. 9,247,040.

(51) Int. Cl.
| | | |
|---|---|---|
| *H04W 76/00* | (2009.01) | |
| *H04M 1/725* | (2006.01) | |
| *H04W 76/02* | (2009.01) | |
| *H04W 4/22* | (2009.01) | |
| *H04M 1/60* | (2006.01) | |

(52) U.S. Cl.
CPC ...... *H04M 1/72577* (2013.01); *H04M 1/72569* (2013.01); *H04W 76/007* (2013.01); *H04M 1/6075* (2013.01); *H04W 4/22* (2013.01); *H04W 76/028* (2013.01)

(58) Field of Classification Search
CPC ..... H04W 4/027; H04W 4/028; H04W 4/008; H04W 4/16; H04W 4/06; H04W 4/22; H04W 76/007; H04W 76/04
USPC .............. 455/414.1, 417, 419, 420, 421, 445, 455/456.1, 459, 517, 550.1, 565, 569.1, 455/569.2, 575.9, 556.1, 557
See application file for complete search history.

(56) References Cited

U.S. PATENT DOCUMENTS

| | | | | |
|---|---|---|---|---|
| 6,166,627 | A * | 12/2000 | Reeley ...................... 340/426.25 |
| 7,925,433 | B2 * | 4/2011 | Smith et al. ................... 705/7.25 |
| 2002/0158754 | A1 * | 10/2002 | Tabata et al. ................... 340/438 |
| 2012/0282906 | A1 * | 11/2012 | Frye et al. ................... 455/414.2 |
| 2012/0282908 | A1 * | 11/2012 | Nicolini ......................... 455/418 |
| 2014/0059426 | A1 * | 2/2014 | Lee et al. ........................ 715/273 |
| 2014/0277833 | A1 * | 9/2014 | Palan ................................. 701/1 |
| 2014/0277888 | A1 * | 9/2014 | Dastoor et al. ................... 701/22 |
| 2015/0054639 | A1 * | 2/2015 | Rosen ........................... 340/439 |
| 2015/0061856 | A1 * | 3/2015 | Raman et al. .................. 340/457 |

* cited by examiner

*Primary Examiner* — Jean Gelin
(74) *Attorney, Agent, or Firm* — Van Pelt, Yi & James LLP

(57) ABSTRACT

A phone vehicle event recorder mount for holding a mobile phone. The phone vehicle event recorder mount comprises an interface and a processor. The interface is configured to receive a connection indication of whether the mobile phone is connected to the mount. The processor is configured to determine whether the mobile phone is connected to the mount based on the connection indication, wherein the mobile phone is connected to the mount in the event that the mobile phone is placed in the mount.

23 Claims, 5 Drawing Sheets

VEHICLE EVENT RECORDER MOBILE PHONE MOUNT

CROSS REFERENCE TO OTHER APPLICATIONS

This application is a continuation of U.S. Pat. No. 9,247,040, entitled VEHICLE EVENT RECORDER MOBILE PHONE MOUNT filed Sep. 24, 2013 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). The vehicle event recorder typically includes an input interface for receiving sensor data from vehicle sensors, a processor for determining the occurrence of anomalous events from sensor data, memory for storing anomalous event data, and an output interface for communicating anomalous event data. As computers become portable and ubiquitous, specialized hardware is no longer necessary to perform the functions of the vehicle event recorder.

BRIEF DESCRIPTION OF THE DRAWINGS

Various embodiments of the invention are disclosed in the following detailed description and the accompanying drawings.

DETAILED DESCRIPTION

Figure 1:
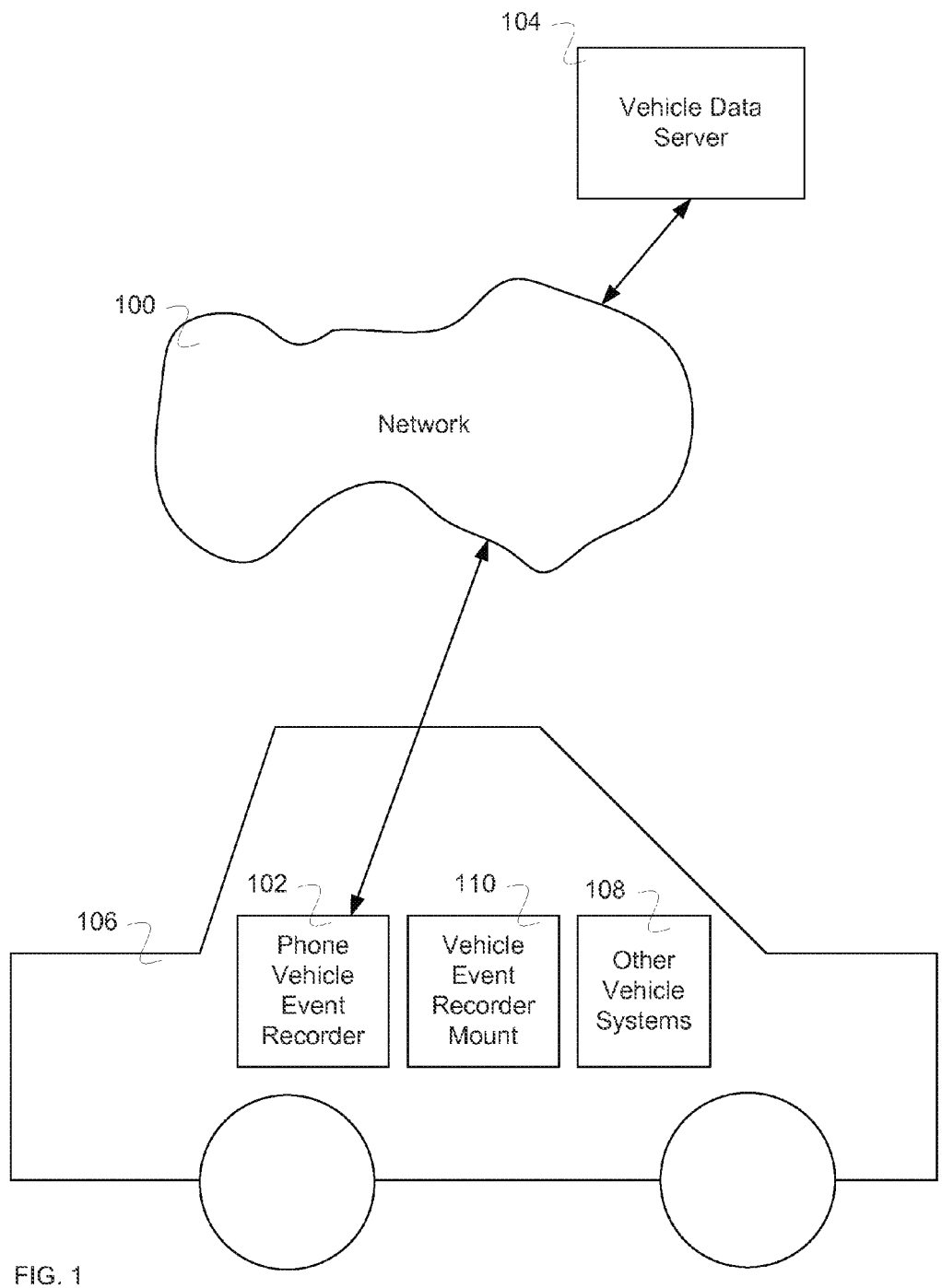
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A phone vehicle event recorder mount is disclosed. The phone vehicle event recorder mount comprises an interface configured to receive an indication of whether a phone vehicle event recorder is connected, and a processor configured to, in the event that the phone vehicle event recorder is connected, provide an indication to disable receiving and transmitting voice phone calls. The phone vehicle event recorder mount additionally comprises a memory coupled to the processor and configured to provide the processor with instructions.

A phone vehicle event recorder mounted on a vehicle using a phone vehicle event recorder mount records vehicle data and anomalous vehicle events. Anomalous vehicle event types include accidents, speed limit violations, rough road events, hard maneuvering events (e.g., hard cornering, hard braking), dangerous driving events (e.g., cell phone usage, eating while driving, working too long of a shift, sleepy driving, etc.), and any other appropriate kind of anomalous vehicle events. The phone vehicle event recorder receives and processes data from sensors (e.g., video recorders, audio recorders, accelerometers, gyroscopes, vehicle state sensors through communication with the vehicle, global positioning system (GPS), etc.) to determine when an anomalous event has occurred. The phone vehicle event recorder transmits event data, including sensor data, to a vehicle data server, where the data is stored and analyzed. Receiving, processing, and transmitting data are standard computing functions that do not require specialized hardware, but can be easily accomplished using an Internet (data)-enabled cellular phone. The phone vehicle event recorder mount comprises a phone mount—for instance, mounted on a vehicle dashboard—for holding a phone. When the phone is placed in the phone mount, it takes on the functions of a vehicle event recorder. The ability of the phone to transmit and receive phone calls is disabled, as the driver can not legally make phone calls while the vehicle is in operation. An application on the phone is executed (e.g., either by the vehicle driver indicating to the phone to execute the application or by an automatic process initiated by the placement of the phone in the phone mount). The application on the phone comprises the vehicle event recorder software, e.g., for receiving and processing sensor data, and transmitting event data. In some embodiments, the vehicle event recorder software additionally accesses sensors included in the phone (e.g., an accelerometer, a gyro, a forward facing camera, a rear facing camera, etc.). In some embodiments, the phone vehicle event recorder accesses vehicle sensors and information by communicating with the vehicle (e.g., via the on-board bus, wirelessly, via the mount, etc.). In some embodiments, the phone vehicle event recorder memory is supplemented using memory in the mount or using programming or processing or stored power available on the mount.

FIG. 1 is a block diagram illustrating an embodiment of a system including a vehicle event recorder. Phone vehicle event recorder 102 comprises a vehicle event recorder mounted using vehicle event recorder mount 110 in vehicle 106 (e.g., a car or truck). In some embodiments, phone vehicle event recorder 102 includes or is in communication with a set of sensors—for example, video recorders, audio recorders, accelerometers, gyroscopes, vehicle state sensors, GPS, outdoor temperature sensors, moisture sensors, laser line tracker sensors, forward radar, advanced driver assistance systems (ADAS), or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an antilocking brake sensor, an engine exhaust sensor, a gear position sensor, a cabin equipment operation sensor, or any other appropriate vehicle state sensors. In some embodiments, phone vehicle event recorder 102 comprises a system for processing sensor data and detecting events. In some embodiments, phone vehicle event recorder 102 comprises map data. In some embodiments, phone vehicle event recorder 102 comprises a system for detecting risky behavior. In various embodiments, phone vehicle event recorder 102 is mounted to vehicle 106 in one of the following locations: the chassis, the front grill, the dashboard, the rear-view mirror, or any other appropriate location. In some embodiments, phone vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a Code Division Multiple Accessing (CDMA) network, a Global System For Mobile (GSM) communications network, Wideband Code Division Multiple Access (W-CDMA) communications network, Long Term Evolution (LTE) communications network, a local area network, a wide area network, the Internet, or any other appropriate network or combination of networks. In some embodiments, network 100 comprises multiple networks, changing over time and location. Phone vehicle event recorder 102 communicates with vehicle data server 104 via network 100. Phone vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by phone vehicle event recorder 102 are downloaded to vehicle data server 104 when vehicle 106 arrives at the home station. In some embodiments, vehicle data server 104 is located at a remote location. In some embodiments, events recorded by phone vehicle event recorder 102 are downloaded to vehicle data server 104 wirelessly. In some embodiments, a subset of events recorded by phone vehicle event recorder 102 is downloaded to vehicle data server 104 wirelessly. Vehicle 106 additionally comprises other vehicle systems in communication with phone vehicle event recorder 102 (e.g., sensor systems, user interface systems, driving subsystems, driver assistance systems, etc.).

Figure 2:
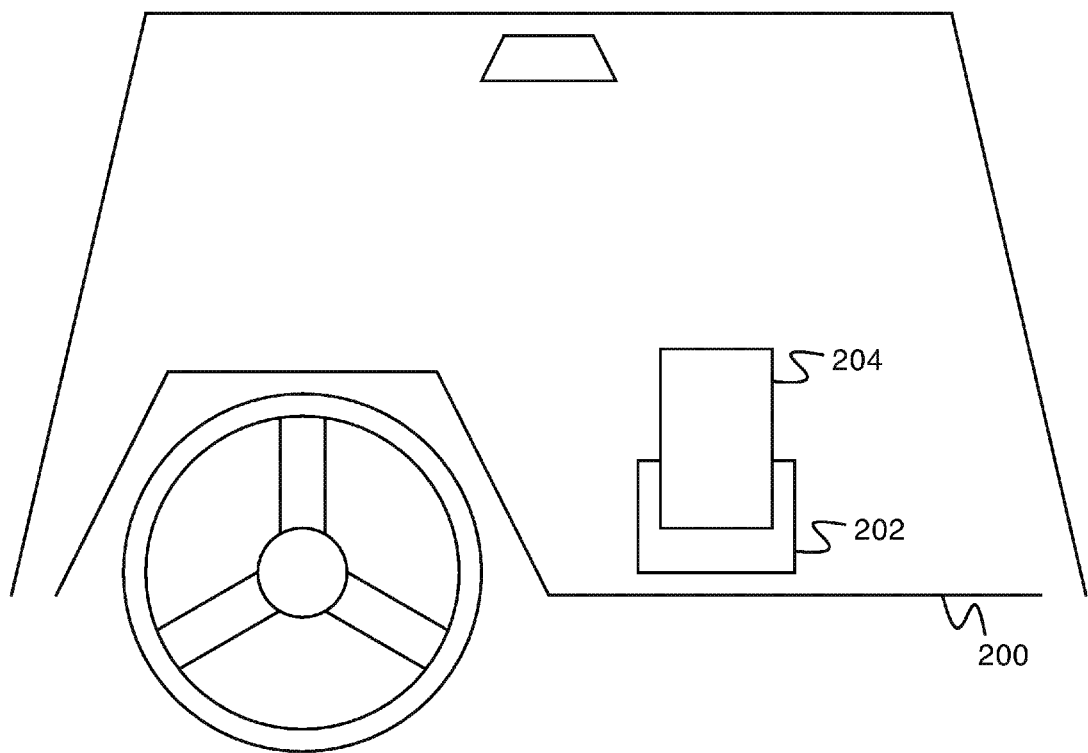
FIG. 2 is a diagram illustrating an embodiment of a vehicle dashboard area.

FIG. 2 is a diagram illustrating an embodiment of a vehicle dashboard area. In some embodiments, the dashboard area shown in FIG. 2 comprises the dashboard area of vehicle 106 of FIG. 1. In the example shown, dashboard 200 comprises a vehicle dashboard. A vehicle dashboard comprises a surface upon which objects can be placed or mounted, forward of the driver and passenger seats in a vehicle. In various embodiments, objects that can be mounted on a vehicle dashboard comprise one or more of the following: a GPS, a cellular phone, a portable video player, a portable audio player, a tablet computer, a paper map holder, or any other appropriate object. Phone vehicle event recorder mount 202 comprises a mount for mounting phone vehicle event recorder 204 to dashboard 200. In various embodiments, phone vehicle event recorder mount 202 mounts phone vehicle event recorder 204 to dashboard 200 to the left of the driver, to the right of the driver, above the steering wheel, at the far right of dashboard 200, to the rear-view mirror, to the windshield, or at any other appropriate location. Phone vehicle event recorder 204 comprises a vehicle event recorder (e.g., a phone operating as a vehicle event recorder). In some embodiments, phone vehicle event recorder 204 comprises a mobile phone (e.g., a smartphone) running vehicle event recorder software (e.g., a vehicle event recorder app). In various embodiments, the vehicle event recorder uses a tablet or other hardware platform in place of the phone.

Figure 3:
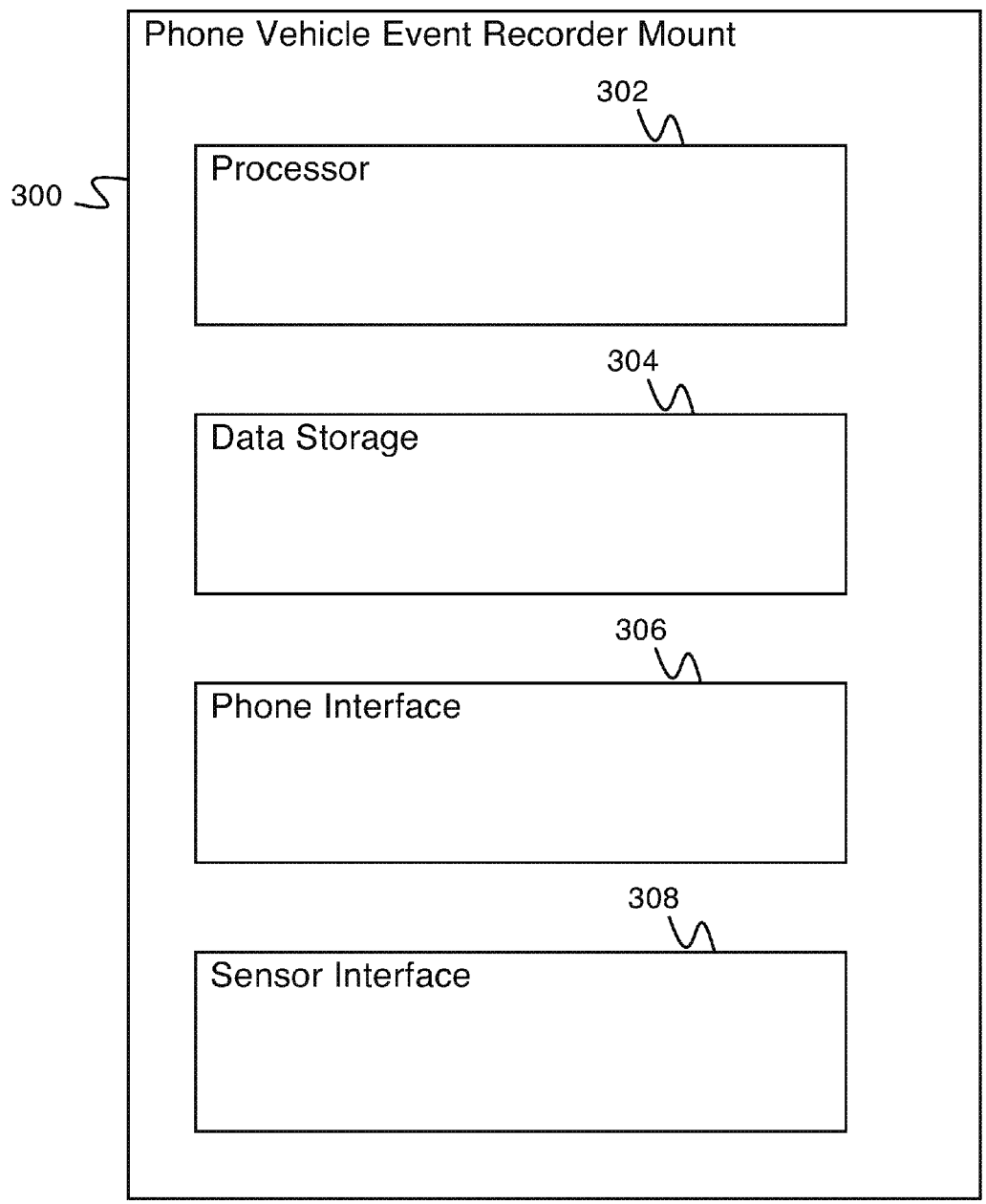
FIG. 3 is a block diagram illustrating an embodiment of a phone vehicle event recorder mount.

FIG. 3 is a block diagram illustrating an embodiment of a phone vehicle event recorder mount. In some embodiments, phone vehicle event recorder mount 300 comprises phone vehicle event recorder mount 202 of FIG. 2. Phone vehicle event recorder mount 300 communicates with a phone (e.g., phone vehicle event recorder 204 of FIG. 2) to act as a vehicle event recorder. Phone vehicle event recorder mount 300 comprises processor 302. Processor 302 controls the behaviors of phone vehicle event recorder mount 300. In various embodiments, processor 302 determines if a phone is connected to phone vehicle event recorder mount 300, provides an indication to disable receiving and transmitting voice phone calls, provides an indication of available resources (e.g., memory, data, programs, power storage, communication links to vehicle and/or sensors/status, etc.), receives event data, stores event data, provides event data, provides map data, provides an indication to enable receiving and transmitting voice phone calls, or performs any other appropriate phone vehicle event recorder function. Data storage 304 comprises a data storage for storing data within phone vehicle event recorder mount 300. In various embodiments, data storage 304 stores event data, map data, configuration data, communications data, or any other appropriate data. Phone interface 306 comprises a phone interface for communicating with a phone (e.g., phone vehicle event recorder 204 of FIG. 2). In some embodiments, power is provided to the phone via phone interface 306 from a connection to a battery or to the vehicle. Sensor interface 308 comprises a sensor interface for receiving sensor data from vehicle systems. In some embodiments, sensor interface 308 comprises an on-board diagnostics (e.g., OBD) interface for receiving sensor data from vehicle systems. In some embodiments, the phone vehicle event recorder mount additionally comprises lights (e.g., LEDs, electroluminescent lights, incandescent lights) for display of information. In some embodiments, the phone vehicle event recorder additionally comprises a display (e.g., an LCD display) for display of information. In various embodiments, the mount includes advanced driver assistance systems (ADAS), a front radar, a back radar, a side radar, or an interface to a separate ADAS or radar system, or any other appropriate systems.

Figure 4:
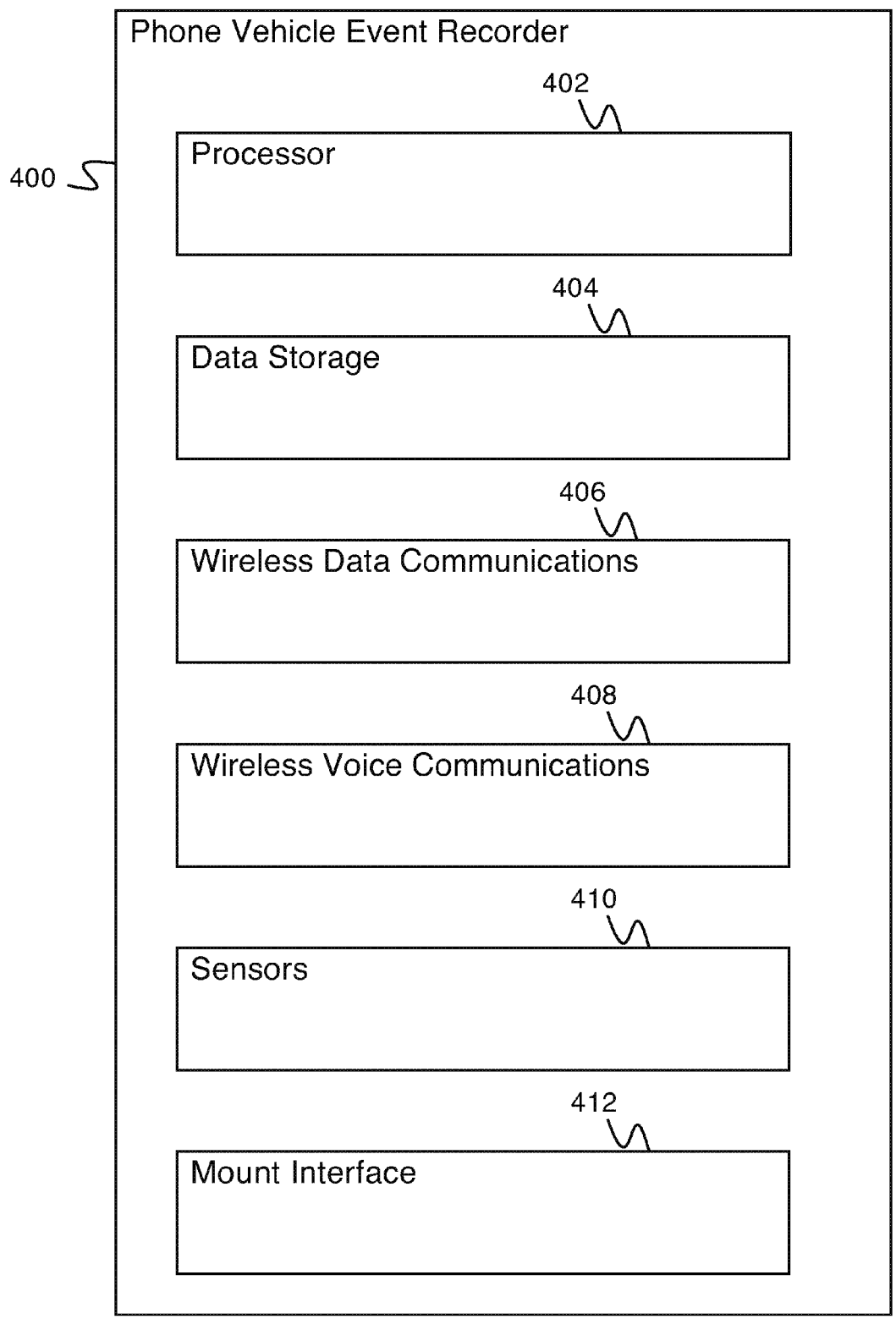
FIG. 4 is a block diagram illustrating an embodiment of a phone vehicle event recorder.

FIG. 4 is a block diagram illustrating an embodiment of a phone vehicle event recorder. In some embodiments, phone vehicle event recorder 400 comprises phone vehicle event recorder 204 of FIG. 2. In some embodiments, phone vehicle event recorder 400 comprises a mobile phone running vehicle event recorder software. In the example shown, phone vehicle event recorder 400 comprises processor 402. Processor 402 controls the behaviors of phone vehicle event recorder 400. In various embodiments, processor 402 comprises a processor for controlling the operations of phone vehicle event recorder 400, for reading and writing information on data storage 404, for communicating via wireless data communications interface 406, for reading data via sensor interface 410, for communicating with a mount via mount interface 412, or for any other appropriate purpose. In some embodiments, processor 402 runs vehicle event recorder software. In some embodiments, vehicle event recorder software comprises software for receiving sensor data (e.g., sensor data from sensors 410 or received via mount interface 412) and detecting vehicle events. In various embodiments, sensor data comprises data from accelerometers, from gyroscopes, from a forward facing camera, from a rear facing camera, or from any other appropriate sensor or sensors. Data storage 404 comprises a data storage for storing data within phone vehicle event recorder 400. In various embodiments, data storage 404 comprises a random access memory (RAM), a read only memory (ROM), a nonvolatile memory, a flash memory, a hard disk, or any other appropriate data storage. In various embodiments, data storage 404 stores event data, map data, configuration data, communications data, or any other appropriate data. Wireless data communications 406 comprises a wireless communication system for transmitting data. In some embodiments, wireless data communications 406 comprises a wireless communication system for transmitting event data to a server. In some embodiments, wireless data communications 406 comprises a local wireless connection (e.g., wireless Ethernet™, Bluetooth™, 802.11 (WiFi), etc.). In some embodiments, wireless data communications 406 comprises a cellular wireless connection (e.g., Global System for Mobile communications (GSM), Long Term Evolution (LTE), Code Division Multiple Accessing (CDMA), Wideband Code Division Multiple Access (W-CDMA), Long Term Evolution (LTE), etc.). In some embodiments, wireless data communications 406 comprises a short message service (SMS) connection. Wireless voice communications 408 comprises a wireless communication system for transmitting voice. Sensors 410 comprises one or more sensors for recording environmental data. In various embodiments, sensors 410 comprises one or more of an accelerometer, a gyroscope, a forward-facing video camera, a rear-facing video camera, a microphone, a temperature sensor, or any other appropriate sensors. Mount interface 412 comprises an interface for communicating with a mount (e.g., phone vehicle event recorder mount 202 of FIG. 2). In some embodiments, mount interface 412 comprises a generic mount interface (e.g., designed to connect with many different mount types that meet its communications specifications). In some embodiments, phone vehicle event recorder 400 communicates with external sensors via mount interface 412. In various embodiments, external sensors comprise an outdoor temperature sensor, a moisture sensor, a laser line tracker sensor, a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, mount interface 412 communicates with an on-board diagnostics (OBD) bus. In some embodiments, vehicle event recorder 400 communicates with external sensors via OBD bus.

Figure 5:
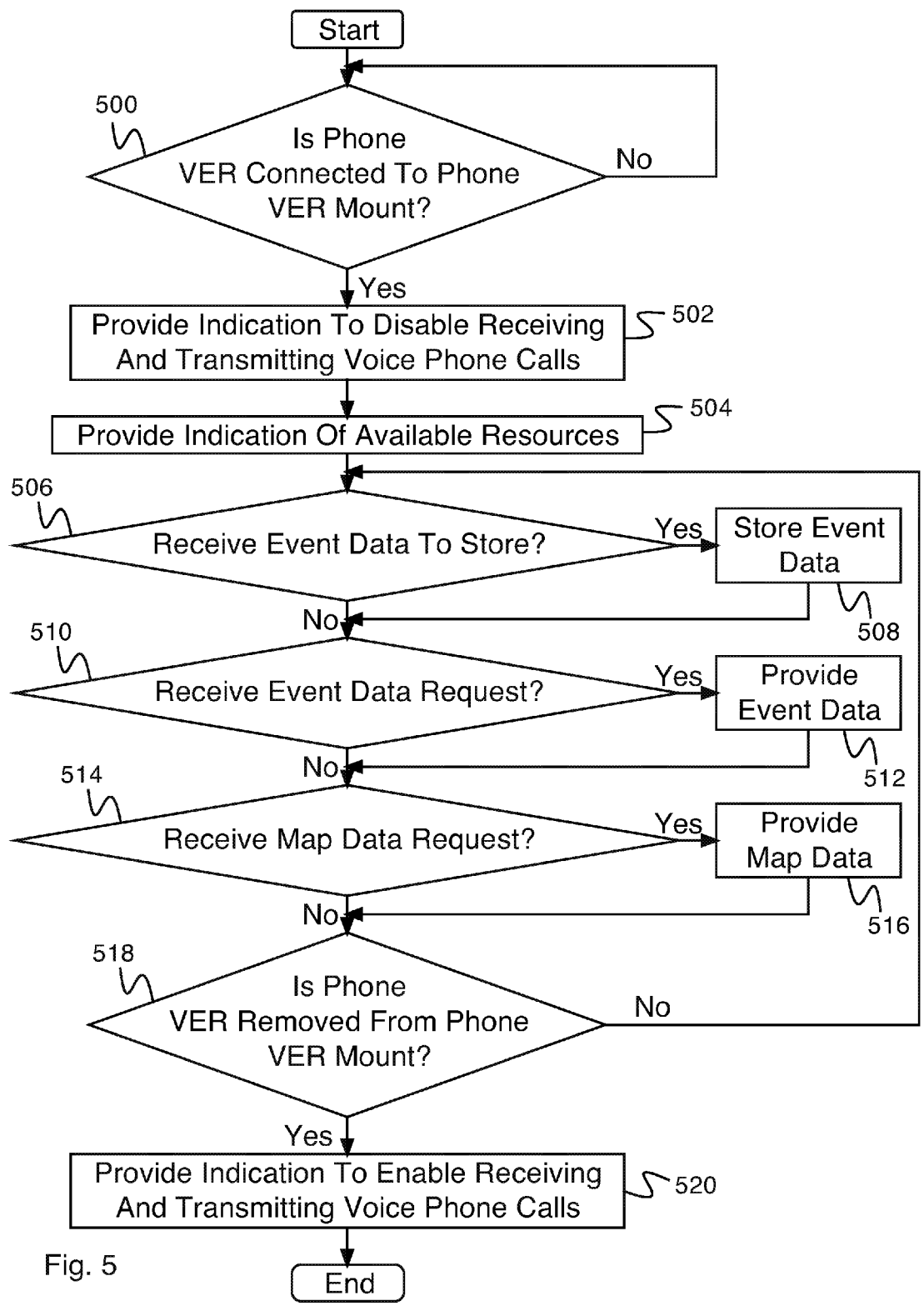
FIG. 5 is a flow diagram illustrating an embodiment of a process for communicating with a phone vehicle event recorder.

FIG. 5 is a flow diagram illustrating an embodiment of a process for communicating with a phone vehicle event recorder. In some embodiments, the process of FIG. 5 is executed by a phone vehicle event recorder mount (e.g., phone vehicle event recorder mount 202 of FIG. 2). In the example shown, in 500, it is determined if a phone VER (e.g., vehicle event recorder) is connected to the phone VER mount. In some embodiments, a driver places a phone VER in the phone VER mount at the beginning of a trip. If it is determined that there is no phone VER connected to the phone VER mount, 500 repeats until it is determined that there is a phone VER connected to the phone VER mount. In the event that it is determined that there is a phone VER connected to the phone VER mount, control passes to 502. In various embodiments, the phone VER mount communicates with the phone VER via a wired interface (e.g., a connector physically connected to the phone), a wireless interface (e.g., Bluetooth™ wireless Ethernet™, etc.), or any other appropriate communications interface. In 502, an indication is provided to (e.g., to the phone VER) to disable receiving and transmitting voice phone calls. In some embodiments, when the vehicle is in operation, it is illegal to for the driver to engage in voice phone calls, so the phone is disabled as a preventative measure. In some embodiments, an indication to disable receiving and transmitting text (e.g., short message service, e.g., SMS) messages is provided as well. In some embodiments, an indication to launch a vehicle event recorder app on the phone VER is provided. In some embodiments, the vehicle event recorder app on the phone VER is manually launched. In 504, an indication of available resources is provided. In various embodiments, available resources comprise available random-access memory, available non-volatile memory, available processor utilization, available sensor data, or any other appropriate phone VER mount resources available to the phone VER. In 506, it is determined if event data to store has been received (e.g., from the phone VER) to store. In some embodiments, the phone VER provides event data to store on the phone VER mount after detecting an anomalous event and recording associated event data. In the event that event data to store has been received, control passes to 508. In 508, the event data is stored. In some embodiments, in addition to storing the event data, the phone VER mount provides an indication to the phone VER to transmit the event data to a server. Control then passes to 510. In the event it is determined in 506 that event data has not been received to store, control passes directly to 510. In 510, it is determined whether an event data request has been received. In some embodiments, the phone VER retrieves previously stored event data stored by the phone VER mount for transmission or analysis. In the event that an event data request has been received, control passes to 512. In 512, event data is provided. In some embodiments, in addition to providing the event data, the phone VER mount provides an indication to the phone VER to transmit the event data to a server. Control then passes to 514. In the event it is determined in 510 that a request for event data has not been received, control passes directly to 514. In 514, it is determined whether a map data request has been received. In some embodiments, the phone VER requests map data when it has determined that the vehicle has moved to a new map region. In the event a map data request has been received, control passes to 516. In 516, the map data is provided. In various embodiments, 514 is parallel to 506; 514, 510 and 506 are all parallel to each other; or any other appropriate order for assessing requests. Control then passes to 518. In the event it is determined in 514 that a request for map data has been received, control passes directly to 518. In 518, it is determined whether the phone VER has been removed from the phone VER mount. In some embodiments, the driver removes the phone VER from the phone VER mount at the end of the trip. If it is determined that the phone VER is not removed from the phone VER mount, control passes to 506, and the process is able to continue to respond to data requests. If it is determined in 518 that the phone VER is removed from the phone VER mount, control passes to 520. In 520, an indication is provided to enable receiving and transmitting voice phone calls (e.g., the phone is put back into its normal state now that the trip is complete). In some embodiments a phone VER user (e.g., a driver) may enable receiving and transmitting voice phone calls by making an indication to the vehicle event recorder software running on the phone VER. In some embodiments, when the phone VER user makes an indication to the phone VER app to enable receiving and transmitting voice phone calls, the phone VER requests permission from the phone VER mount, and in response, the phone VER mount provides an indication to the phone to re-enable receiving and transmitting voice phone calls.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A phone vehicle event recorder mount, comprising:
   a mount for holding a mobile phone;
   an interface configured to receive a connection indication of whether the mobile phone is connected to the mount; and
   a processor configured to:
      determine whether the mobile phone is connected to the mount based on the connection indication, wherein the mobile phone is connected to the mount in the event that the mobile phone is placed in the mount; and
      responsive to a determination that the mobile phone is connected to the mount, activate vehicle event recorder functions, wherein the vehicle event recorder functions are performed by the mobile phone and include: receiving vehicle data, detecting vehicle events based on the received vehicle data, and transmitting data regarding the detected vehicle events to an external server.

2. The phone vehicle event recorder mount of claim 1, wherein the interface comprises a wired interface.

3. The phone vehicle event recorder mount of claim 1, wherein the interface comprises a wireless interface.

4. The phone vehicle event recorder mount of claim 1, wherein the processor is further configured to provide an indication to launch a vehicle event recorder app on the mobile phone, the vehicle event recorder app being configured to perform the vehicle event recorder functions.

5. The phone vehicle event recorder mount of claim 4, wherein the detecting vehicle events includes determining that an anomalous event has occurred.

6. The phone vehicle event recorder mount of claim 4, wherein the detecting vehicle events is based on one or more accelerometers.

7. The phone vehicle event recorder mount of claim 4, wherein the detecting vehicle events is based on one or more gyroscopes.

8. The phone vehicle event recorder mount of claim 4, wherein the detecting vehicle events is based on a camera.

9. The phone vehicle event recorder mount of claim 1, wherein the processor is further configured to provide an indication to disable receiving and transmitting text communications.

10. The phone vehicle event recorder mount of claim 1, wherein the processor is further configured to provide an indication to provide event data to the external server.

11. The phone vehicle event recorder mount of claim 1, wherein the interface is further configured to communicate with vehicle systems.

12. The phone vehicle event recorder mount of claim 11, wherein the interface is configured to communicate with vehicle systems via an OBD bus.

13. The phone vehicle event recorder mount of claim 11, wherein the interface is configured to receive sensor data from vehicle systems.

14. The phone vehicle event recorder mount of claim 1, further comprising a memory.

15. The phone vehicle event recorder mount of claim 14, wherein the memory is configured to store event data.

16. The phone vehicle event recorder mount of claim 14, wherein the memory is configured to store map data.

17. The phone vehicle event recorder mount of claim 1, wherein the processor is further configured to provide an indication to the mobile phone of available resources.

18. The phone vehicle event recorder mount of claim 1, further comprising one or more lights for display of information.

19. The phone vehicle event recorder mount of claim 1, further comprising a display screen.

20. The phone vehicle event recorder mount of claim 1, wherein the processor is further configured to provide an indication to re-enable receiving and transmitting voice phone calls when the mobile phone is removed.

21. The phone vehicle event recorder mount of claim 1, wherein the processor is further configured to provide an indication to re-enable receiving and transmitting voice phone calls in response to an indication to a vehicle event recorder app.

22. A method for a phone vehicle event recorder mount, comprising:
   receiving a connection indication of whether a mobile phone is connected to the mount, wherein the mount holds the mobile phone;
   determining, using a processor, whether the mobile phone is connected to the mount based on the connection indication, wherein the mobile phone is connected to the mount in the event that the mobile phone is placed in the mount; and
   responsive to a determination that the mobile phone is connected to the mount, activating vehicle event recorder functions, wherein the vehicle event recorder functions are performed by the mobile phone and include: receiving vehicle data, detecting vehicle events based on the received vehicle data, and transmitting data regarding the detected vehicle events to an external server.

23. A computer program product for a phone vehicle event recorder mount, the computer program product being embodied in a non-transitory computer readable storage medium and comprising computer instructions for:
   receiving a connection indication of whether a mobile phone is connected to the mount, wherein the mount holds the mobile phone;

determining, using a processor, whether the mobile phone is connected to the mount based on the connection indication, wherein the mobile phone is connected to the mount in the event that the mobile phone is placed in the mount; and responsive to a determination that the mobile phone is connected to the mount, activating vehicle event recorder functions, wherein the vehicle event recorder functions are performed by the mobile phone and include: receiving vehicle data, detecting vehicle events based on the received vehicle data, and transmitting data regarding the detected vehicle events to an external server.

* * * * *